United States Patent Office 2,863,929
Patented Dec. 9, 1958

2,863,929

PREPARATION OF SATURATED CARBINOLS BY THE HYDROGENATION AND HYDROGENOLYSIS OF ACETYLENIC GLYCOLS

Arthur I. Lowell, Plainfield, N. J., assignor to Air Reduction, Incorporated, New York, N. Y., a corporation of New York No Drawing. Application January 12, 1955
Serial No. 481,481

17 Claims. (Cl. 260—642)

The present invention relates to the hydrogenation and hydrogenolysis of aliphatic ditertiary acetylenic glycols. More specifically, this invention relates to the selective hydrogenation and hydrogenolysis of aliphatic ditertiary acetylenic glycols to obtain high conversions to the corresponding saturated carbonols.

The aliphatic ditertiary acetylenic glycols particularly encompassed by this invention may be represented by the formula

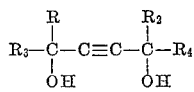

wherein each of R, $R_2$, $R_3$ and $R_4$ is an alkyl radical, which may be the same or different, and preferably R and $R_2$ are methyl radicals and $R_3$ and $R_4$ are preferably alkyl radicals containing from 1 to 8 carbon atoms. Illustrative of the aliphatic ditertiary acetylenic glycols to which this invention is applicable are 2,5-dimethyl-3-hexyne-2,5-diol; 3,6-dimethyl-4-octyne-3,6-diol; 4,7-dimethyl-5-decyne-4,7-diol; 2,4,7,9-tetramethyl-5-decyne-4,7-diol; 2,3,6,7-tetramethyl-4-octyne-3,6-diol; 3,6-diethyl-4-octyne-3,6-diol; and 5,8-dimethyl-6-dodecyne-5,8-diol.

In the catalytic treatment of aliphatic ditertiary actylenic glycols with hydrogen in the presence of a reaction medium solvent, a number of competing reactions occur. It is possible to obtain as reaction products the corresponding saturated carbinol, the corresponding saturated glycol, and the corresponding hydrocarbon. Normally, each of these products is obtained to a greater or lesser degree. For example, in the catalytic hydrogenation and hydrogenolysis of 3,6-dimethyl-4-octyne-3,6-diol, it is possible to obtain: (a) the corresponding saturated glycol, 3,6-dimethyloctane-3,6-diol, by saturating the acetylenic bond; (b) the corresponding saturated carbinol, 3,6-dimethyloctan-3-ol, by saturating the acetylenic bond and the hydrogenolysis of one —OH group; and (c) the corresponding hydrocarbon, 3,6-dimethyloctane, by saturating the acetylenic bond and the hydrogenolysis of both —OH groups. Since the half hydrogenolysis product, the saturated carbinol, has been found to possess a strong, pleasant and fragrant odor and is consequently of considerable interest as a perfume ingredient and for industrial odor masking purposes, it is desirable that the catalytic reaction of aliphatic ditertiary acetylenic glycols with hydrogen be controlled so as to obtain maximum yields and conversions to the saturated carbinol.

In accordance with this invention, it has been found that when an aliphatic ditertiary acetylenic glycol is subjected to catalytic hydrogenation and hydrogenolysis in the presence of a selective solvent and a palladium catalyst, the corresponding saturated carbinol can be obtained in unusually high conversions. The significant and unique feature of this invention is in the discovery that the nature of the solvent reaction medium selectively directs the reaction towards the formation of one or the other of the possible reaction products; and in the further discovery that if isopropyl alcohol, normal butyl alcohol, secondary butyl alcohol, tertiary butyl alcohol, or a mixture of two or more of said alcohols is employed as the solvent medium high conversions and yields of the desired reaction product, the corresponding carbinol, can be obtained. It has also been found that as the molecular weight of the solvent alcohol in any given series increased, the conversion to the saturated carbinol increased up to a point where it began to fall off. It has further been found that as the branch chaining on the carbinol carbon atom of the solvent alcohol increased, i. e. from a primary to a tertiary alcohol, in any given series, the conversion to the saturated carbinol increased. As stated above, the alcohol solvents which have been found to give unexpectedly high conversions to the saturated carbinol are: isopropyl alcohol, n-butanol, sec.-butyl alcohol, and tert.-butyl alcohol. Mixtures of these alcohols may be likewise used to obtain a combined selective effect. For example, isopropyl alcohol, per se, has a lower conversion to the saturated carbinol in view of the competing reaction to the saturated glycol, and tert.-butyl alcohol, per se, has a lower conversion to the saturated carbinol due to the competing reaction to form the hydrocarbon than a mixture of both isopropyl alcohol and tert.-butyl alcohol.

The catalyst for this reaction is preferably and desirably palladium supported on a chemically inert adsorbent carrier. Such chemically inert adsorbent carriers may be activated carbon, charcoal, pumice, alumina, silica gel, kieselguhr, fuller's earth, bentonite, kaolin, barium sulfate, and the like. A 5% palladium catalyst, i. e. 5% by weight of Pd based on the total weight of the catalyst, has been found to be most effective. In contrast, the use of a 10% palladium catalyst gave less economical results. While reaction times were about the same, the recovery of the saturated carbinol was less using a 10% palladium catalyst than that obtained when a 5% palladium catalyst was used. The catalyst may be regenerated by digesting it with a saturated alcohol solvent at the boiling point of the solvent. In this regard, methanol and tert.-butanol have been found to be especially useful. It is believed that the hot alcohol solvent washes the catalyst surface and probably is adsorbed by the catalyst in preference to any poisoning impurities. Raney nickel and Girdler nickel catalysts have been found to be ineffective in obtaining high conversions of the saturated carbinol since they tend to direct the reaction towards the formation of the corresponding saturated glycol under the conditions employed in the present process. On the other hand, platinum catalysts have also been found to be ineffective since they are apparently too active and tend to direct the reaction towards the formation of the complete hydrogenolysis product, the corresponding hydrocarbon.

It is desirable, in some cases, that the aliphatic ditertiary acetylenic glycol employed for this reaction be of a purified grade, since the technical grade of the aliphatic ditertiary acetylenic glycol may tend to poison the catalyst and inhibit the formation of the saturated carbinol. Such purification of the ditertiary acetylenic glycol can be accomplished by recrystallization of the said glycol from a suitable solvent such as heptane, toluene, and the like; or by redistillation of the acetylenic glycol. An adsorbent, such as activated charcoal or the like, may be added to the solution of the aliphatic ditertiary acetylenic glycol when recrystallizing to remove additional impurities.

The hydrogenation and hydrogenolysis may be conducted over a range of total pressures, e. g. from about one atmosphere to about ten atmospheres; however, pressures of from about three to about five atmospheres are preferred. Pressures much above 5 atmospheres tend to make the reaction too violent and present some difficulty with respect to controlling the rate and course of the reaction. It is preferred practice to originate the reaction at atmospheric pressure, slowly raising the total pressure to about 3 to about 5 atmospheres over a period of time which may extend up to about ½ hour.

The temperature employed may vary from about 17° C. to about 160° C., and the reaction temperature is preferably within the range of from about 65° C. to about 85° C. If the reaction is carried out much below 17° C., then expensive cooling means are necessary and the rate of reaction is appreciably decreased; and, if the reaction is carried out much above 160° C., then the total pressure becomes excessive due to the vapor pressure of the solvent. Since the reaction is exothermic, it has been found desirable to initiate the reaction at room temperature and to permit the heat of reaction to raise the temperature to about 80°–85° C., at the same time that the pressure is being raised to about 3 to about 5 atmospheres, and to then continue the reaction at that temperature and pressure. It is also preferred practice to maintain the reaction conditions for a period of time, e. g. about one hour, after the apparent adsorption of hydrogen has stopped to ensure that any olefinic materials have been completely saturated, since the presence of olefinic materials makes recovery of the desired saturated carbinol more difficult.

It has also been found desirable to preliminarily flush the reaction vessel with an inert gas, such as nitrogen, to eliminate or remove any oxygen that might be present and which may explosively react with hydrogen. The reaction time may vary from about 3 hours to about 9 hours depending upon the efficiency of hydrogen contact with the catalyst and the reactants. Such contact can be improved by adequate mechanical dispersion of the hydrogen, catalyst and reactants in solution. Any suitable means for accomplishing this may be employed, such as mechanical agitation or stirring.

In one way of carrying out the process in accordance with this invention, a mixture of the aliphatic ditertiary acetylenic glycol, solvent and catalyst is prepared. After this mixture has been introduced into a suitable reaction vessel equipped with a stirring device, stirring is begun and the hydrogen introduced. The internal reaction temperature rises rapidly to about 80° C. Sufficient heat may be applied to maintain this temperature. After the reaction is completed, the reaction mixture may be filtered to remove the catalyst. The solvent is stripped off at atmospheric pressure. The residue is then distilled under reduced pressure to recover the various reaction products. Any hydrocarbon formed would be the first to distill over, followed by the major portion of the residue which is the desired saturated carbinol. Any saturated glycol formed will distill over last. A further purification of the saturated carbinol may be accomplished by additional distillation.

The effect of the selective solvent alcohol in directing the reaction towards the formation of the saturated carbinol is illustrated by the following table. In the various runs recorded in Table I, the reaction conditions were kept constant, varying only the solvent employed so that the conversion to the saturated carbinol is attributable only to the effect of the solvent. In these runs, a Parr low-pressure hydrogenation apparatus was used. The aliphatic ditertiary acetylenic glycol, in this case 3,6-dimethyl-4-octyne-3,6-diol, and one gram of 5% palladium on charcoal catalyst were added to 150 ml. of the solvent. Three to five atmospheres of hydrogen was the operating pressure range; and the internal or reaction temperature was maintained at approximately 80° C. The reaction time, the amount of ditertiary acetylenic glycol employed, and the percent hydrogen adsorbed is indicated in the accompanying table. The product was recovered in the following manner. The catalyst was separated by vacuum filtration and washed with a small amount of the same type of solvent used as the reaction medium. The solvent was stripped from the filtrate at atmospheric pressure. The distillation was continued under reduced pressure. The carbinol fraction was taken off at 89° C./11 mm.; the saturated glycol fraction was taken off at 130° C./11 mm. In each instance, the ditertiary acetylenic glycol employed was recrystallized prior to the reaction with hydrogen. In run No. 9, an equal mixture of isopropyl alcohol and tert.-butyl alcohol were employed in making up the total volume of 150 ml.

TABLE 1

*Effect of the solvent on the conversion of a ditertiary acetylenic glycol to the corresponding saturated carbinol*

| Run No. | 3,6-Dimethyl-4-Octyne-3,6-Diol (Moles) | Solvent | Reaction Time (hrs.) | Calcd. Pressure Drop | Found Pressure Drop | Percent H₂ Adsorbed | Moles Satd. Carbinol Recovered | Moles Satd. Glycol Recovered | Percent Satd. Carbinol Recovered | Percent Satd. Glycol Recovered | Total percent Recovered | Mole Ratio of Carbinol: Glycol |
|---|---|---|---|---|---|---|---|---|---|---|---|---|
| 1 | 0.73 | Methyl Alcohol | 12 | 186 | 178 | 95.5 | 0.29 | 0.32 | 40 | 44 | 84 | 1:1.1 |
| 2 | 0.71 | Ethyl Alcohol | 7.5 | 181 | 176 | 97 | 0.32 | 0.32 | 45 | 45 | 90 | 1:1 |
| 3 | 0.70 | n-Propyl Alcohol | 8.0 | 179 | 152 | 85 | 0.37 | 0.20 | 46 | 29 | 75 | 1.6:1 |
| 4 | 0.70 | n-Butyl Alcohol | 6.5 | 179 | 185 | 100+ | 0.45 | 0.15 | 64 | 21 | 85 | 3:1 |
| 5 | 0.70 | n-Amyl Alcohol | 7.5 | 179 | 173 | 96.5 | 0.34 | 0.38 | 48.5 | 54 | 102.5 | 1:1.1 |
| 6 | 0.70 | Isopropyl Alcohol | 5.25 | 179 | 187 | 100+ | 0.475 | 0.13 | 68 | 18.5 | 86.5 | 3.7:1 |
| 7 | 0.70 | sec.-Butyl Alcohol | 6 | 179 | 191 | 100+ | 0.51 | 0.10 | 73 | 14 | 87 | 5.2:1 |
| 8 | 0.73 | tert.-Butyl Alcohol | 7.5 | 186 | 201 | 100+ | 0.475 | 0.047 | 65 | 6.5 | 71.5 | 10:1 |
| 9 | 0.72 | Isopropyl Alcohol/tert.-Butyl Alcohol | 9 | 185 | 188 | 101.5 | 0.54 | 0.03 | 74.5 | 4 | 78.5 | 18.5:1 |
| 10 | 0.70 | Isobutyl Alcohol | 7 | 179 | 166 | 93 | 0.26 | 0.40 | 37 | 57 | 94 | 1:1.5 |
| 11 | 0.70 | Isoamyl Alcohol | 7.5 | 179 | 150 | 84 | 0.13 | 0.55 | 18.5 | 78.5 | 97 | 1:4.2 |

The following specific examples will serve to further illustrate preferred embodiments of the invention.

EXAMPLE 1

One hundred and twenty-seven grams (0.75 mole) of recrystallized 3,6-dimethyl-4-octyne-3,6-diol, 150 ml. of sec.-butyl alcohol and 1 g. of palladium on charcoal catalyst (5%) were placed in a pressure bottle. The bottle was mounted on a Parr low-pressure hydrogenation apparatus, and flushed with hydrogen. A measured quantity of hydrogen was admitted under a pressure of 3–5 atmospheres. The temperature of the reaction mixture was brought up to 70°–80° C. by a combination of the exothermic heat of reaction and external heating. The temperature was maintained at 70°–80° C. during the remainder of the hydrogenation and hydrogenolysis. The hydrogen uptake was usually in slight excess of the calculated pressure drop for hydrogenation of the triple bond and hydrogenolysis of one hydroxyl group. The reaction is completed within seven hours. The catalyst was separated by filtration and washed with hot solvent. The solvent was stripped from the filtrate at atmospheric pressure. The distillation was continued under reduced pressure (11 mm.) through a short Vigreux column. 3,6-dimethyloctane and the remainder of the solvent was taken off up to 60° C. (rapid temperature rise at this point). The bulk of the saturated carbinol was taken off at 85° C. The temperature was allowed to rise to 115° C. when a viscous substance was noted in the condenser. At this point, receivers were changed and 3,6-dimethyl-octane-3,6-diol was collected. The main bulk of the glycol came over at 129° C. (11 mm.).

The conversion to 3,6-dimethyloctan-3-ol was 73% and there was a 14% conversion to 3,6-dimethyloctane-3,6-diol.

EXAMPLE 2

106.5 g. (0.75 mole) of 2,5-dimethyl-3-hexyne-2,5-diol, recrystallized from heptane, were dissolved in 150 ml. of isopropyl alcohol and placed in a Parr bottle. One gram of 5% palladium on charcoal catalyst was added, and the bottle was mounted on a Parr low-pressure hydrogenation apparatus. Hydrogen was admitted to the bottle at 35–50 p. s. i. g. The hydrogen pressure drops were noted. The heat of reaction raised the temperature of the reaction mixture from room temperature to 80° C. in a short time. The temperature was maintained at 80° C. throughout the remainder of the reaction. When hydrogen adsorption ceased, in about four hours, the reaction was considered completed. The catalyst was separated by filtration and washed with a small amount of isopropanol. The filtrate was distilled and the solvent, isopropanol, was taken off at atmospheric pressure. The distillation residue was further distilled to recover the following products:

2,5-dimethylhexane; None
2,5-dimethylhexan-2-ol; 49 g. 50% conversion
2,5-dimethylhexane-2,5-diol; 23 g., 16% conversion

EXAMPLE 3

156 g. (0.75 mole) of redistilled 4,7-dimethyl-5-decyne-4,7-diol was dissolved in 150 ml. of tert.-butyl alcohol and placed in a Parr bottle. One gram of 5% palladium on charcoal catalyst was added, and the bottle was mounted on a Parr low-pressure hydrogenation apparatus. Hydrogen was admitted to the bottle at 35–50 p. s. i. g. The hydrogen pressure drops were noted. The temperature of the reaction was raised to 80° C. by the heat of reaction, and maintained at that temperature until the reaction was completed. After the reaction had ended, in about four hours, the catalyst was separated by filtration and washed with a small amount of tert.-butyl alcohol. The filtrate was distilled and the solvent, tert.-butyl alcohol, was taken off at atmospheric pressure. The resultant distillation residue was further distilled to recover the following ingredients:

4,7-dimethyldecane; 23.5 g., 13% conversion
4,7-dimethyldecan-4-ol; 80 g., 57% conversion, B. P. 85° C. at 2.5 mm; $n_D^{20}$ 1.4423
Analysis: Calculated for $C_{12}H_{26}O$: C, 77.45; H, 13.97
Found: C, 77.4, 77.5; H, 13.80, 13.87
4,7-dimethyldecane-4,7-diol; 18 g. 12% conversion The compound 4,7-dimethyldecan-4-ol is a novel substance which has been found to have especial utility as a perfume and odor masking agent. When incorporated in soaps (powdered, flaked or bar) or shampoos in small but effective amounts, it is capable of imparting a pleasant odor to them.

It will be understood that various modifications may be made. However, the scope of this invention is not to be limited except as defined by the claims.

What is claimed is:

1. A process for the selective hydrogenation and hydrogenolysis of an aliphatic symmetrical ditertiary mono-acetylenic glycol wherein the reaction is primarily directed to the formation of the corresponding saturated mono-hydric carbinol which comprises subjecting an aliphatic symmetrical ditertiary mono-acetylenic glycol to the action of hydrogen, at a pressure within the range of from about 1 to about 10 atmospheres and at a temperature within the range of about 17° C. to about 160° C., in the presence of a palladium catalyst and in a solvent reaction medium selected from the group consisting of isopropyl alcohol, n-butyl alcohol, sec.-butyl alcohol, tert.-butyl alcohol, and mixtures thereof.

2. A process for the selective hydrogenation and hydrogenolysis of an aliphatic symmetrical ditertiary mono-acetylenic glycol wherein the reaction is primarily directed to the formation of the corresponding saturated mono-hydric carbinol which comprises subjecting an aliphatic symmetrical ditertiary acetylenic glycol to the action of hydrogen in the presence of a palladium catalyst, at a pressure within the range of about 3 to about 5 atmospheres and a temperature within the range of about 65° to about 85° C., and in a solvent reaction medium selected from the group consisting of isopropyl alcohol, n-butyl alcohol, sec.-butyl alcohol, tert.-butyl alcohol, and mixtures thereof.

3. A process for the selective hydrogenation and hydrogenolysis of an aliphatic symmetrical ditertiary mono-acetylenic glycol wherein the reaction is primarily directed to the formation of the correspondnig saturated mono-hydric carbinol, as defined in claim 2, wherein said palladium catalyst is suspended on a chemically inert adsorbent support.

4. A process for the selective hydrogenation and hydrogenolysis of an aliphatic symmetrical ditertiary mono-acetylenic glycol wherein the reaction is primarily directed to the formation of the corresponding saturated mono-hydric carbinol, as defined in claim 2, wherein the palladium catalyst is palladium supported on charcoal.

5. A process for the selective hydrogenation and hydrogenolysis of an aliphatic symmetrical ditertiary acetylenic glycol wherein the reaction is primarily directed to the formation of the corresponding saturated mono-hydric carbinol which comprises subjecting an aliphatic ditertiary acetylenic glycol, represented by the formula

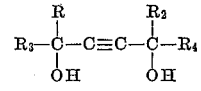

wherein each of R, $R_2$, $R_3$ and $R_4$ is an alkyl radical to the action of hydrogen in the presence of a palladium catalyst, at a pressure within the range of about 1 atmosphere to about 10 atmospheres and at a temperature within the range of about 17° C. to about 160° C., and in a solvent reaction medium selected from the group consisting of isopropyl alcohol, n-butyl alcohol, sec.-butyl alcohol, tert.-butyl alcohol and mixtures thereof.

6. A process for the selective hydrogenation and hydrogenolysis of 3,6-dimethyl-4-octyne-3,6-diol wherein the reaction is primarily directed to the formation of the corresponding saturated mono-hydric carbinol which comprises subjecting said dimethyl octynediol to the action of hydrogen in the presence of a palladium catalyst, at a pressure within the range of about 1 atmosphere to about 10 atmospheres and at a temperature within the range of about 17° C. to about 160° C., and in a solvent reaction medium selected from the group consisting of isopropyl alcohol, n-butyl alcohol, sec.-butyl alcohol, tert.-butyl alcohol and mixtures thereof.

7. A process for the selective hydrogenation and hydrogenolysis of 3,6-dimethyl-4-octyne-3,6-diol wherein the reaction is primarily directed to the formation of the corresponding saturated mono-hydric carbinol, as defined in claim 6, wherein the solvent reaction medium comprises n-butyl alcohol.

8. A process for the selective hydrogenation and hydrogenolysis of 3,6-dimethyl-4-octyne-3,6-diol wherein the reaction is primarily directed to the formation of the corresponding saturated mono-hydric carbinol, as defined in claim 6, wherein the solvent reaction medium comprises sec.-butyl alcohol.

9. A process for the selective hydrogenation and hydrogenolysis of 3,6-dimethyl-4-octyne-3,6-diol wherein the reaction is primarily directed to the formation of the corresponding saturated mono-hydric carbinol, as defined in claim 6, wherein the solvent reaction medium comprises tert.-butyl alcohol.

10. A process for the selective hydrogenation and hydrogenolysis of 3,6-dimethyl-4-octyne-3,6-diol wherein the reaction is primarily directed to the formation of the corresponding saturated mono-hydric carbinol, as defined in claim 6, wherein the solvent reaction medium comprises isopropyl alcohol.

11. A process for the selective hydrogenation and hydrogenolysis of 3,6-dimethyl-4-octyne-3,6-diol wherein the reaction is primarily directed to the formation of the corresponding saturated mono-hydric carbinol, as defined in claim 6 wherein the solvent reaction medium comprises a mixture for tert.-butyl alcohol and isopropyl alcohol.

12. A process for the selective hydrogenation and hydrogenolysis of 4,7-dimethyl-5-decyne-4,7-diol wherein the reaction is primarily directed to the formation of the corresponding saturated mono-hydric carbinol which comprises subjecting said dimethyl decynediol to the action of hydrogen in the presence of a palladium catalyst, at a pressure within the range of about 1 atmosphere to about 10 atmospheres and at a temperature within the range of about 17° C. to about 160° C. and in a solvent reaction medium selected from the group consisting of isopropyl alcohol, n-butyl alcohol, sec.-butyl alcohol, tert.-butyl alcohol and mixtures thereof.

13. A process for the selective hydrogenation and hydrogenolysis of 2,5-dimethyl-3-hexyne-2,5-diol wherein the reaction is primarily directed to the formation of the corresponding saturated mono-hydric carbinol which comprises subjecting said dimethyl hexynediol to the action of hydrogen in the presence of a palladium catalyst at a pressure within the range of about 1 atmosphere to about 10 atmospheres and at a temperature within the range of about 17° C. to about 160° C. and in a solvent reaction medium selected from the group consisting of isopropyl alcohol, n-butyl alcohol, sec.-butyl alcohol, tert.-butyl alcohol, and mixtures thereof.

14. A process for the selective hydrogenation and hydrogenolysis of 2,5-dimethyl-3-hexyne-2,5-diol wherein the reaction is primarily directed to the formation of the corresponding saturated mono-hydric carbinol, as defined in claim 13, wherein the solvent reaction medium comprises n-butyl alcohol.

15. A process for the selective hydrogenation and hydrogenolysis of 2,5-dimethyl-3-hexyne-2,5-diol wherein the reaction is primarily directed to the formation of the corresponding saturated mono-hydric carbinol, as defined in claim 13, wherein the solvent reaction medium comprises sec.-butyl alcohol.

16. A process for the selective hydrogenation and hydrogenolysis of 2,5-dimethyl-3-hexyne-2,5-diol wherein the reaction is primarily directed to the formation of the corresponding saturated mono-hydric carbinol, as defined in claim 13, wherein the solvent reaction medium comprises tert.-butyl alcohol.

17. A process for the selective hydrogenation and hydrogenolysis of 2,5-dimethyl-3-hexyne-2,5-diol, wherein the reaction is primarily directed to the formation of the corresponding saturated mono-hydric carbinol, as defined in claim 13, wherein the solvent reaction medium comprises isopropyl alcohol.

References Cited in the file of this patent

UNITED STATES PATENTS 2,335,795     Reppe et al. _____ Nov. 30, 1943

OTHER REFERENCES

Zalkind et al.: J. Russ. Phys. Chem. Soc., vol. 46 (1914), pp. 1527–39.

Zalkind et al.: J. Russ. Phys. Chem. Soc., vol. 53 (1921), pp. 279–87.

Johnson: Acetylenic Compounds, vol. 1 (1946), pp. 188–9, Arnold & Co., London.

Copenhaver et al.: Acetylene and Carbon Monoxide Chemistry (1949), Reinhold, New York, pp. 130–131.

UNITED STATES PATENT OFFICE

CERTIFICATE OF CORRECTION

Patent No. 2,863,929 December 9, 1958

Arthur I. Lowell

It is hereby certified that error appears in the above numbered patent requiring correction and that the said Letters Patent should read as corrected below.

In the grant, lines 2 and 12, and in the heading to the printed specification, lines 5 and 6, name of assignee, for "Air Reduction, Incorporated", each occurrence, read -- Air Reduction Company, Incorporated --; column 2, lines 18 and 21, for "per se", each occurrence, read -- per se --; column 6, line 14, for "acetylenic" read -- mono-acetylenic --; line 25, for "correspondnig" read -- corresponding --; column 7, line 20, for "a mixture for" read -- a mixture of --.

Signed and sealed this 9th day of June 1959.

(SEAL)
Attest:

KARL H. AXLINE
Attesting Officer

ROBERT C. WATSON
Commissioner of Patents